3,043,809
PREPARATION OF CHELATING RESINS FROM POLYMERIC VINYLBENZYLAMINE AND GLYCOLONITRILE
Leonard A. Mattano, Midland, Mich., assignor to The Dow Chemical Company, Midland, Mich., a corporation of Delaware
No Drawing. Filed July 29, 1958, Ser. No. 751,609
2 Claims. (Cl. 260—78)

This invention concerns a method for making polymeric vinylbenzyl aminoacetic acid chelating resins. More particularly, it concerns a method for making polymeric vinylbenzyl aminoacetic acid chelating resins by reacting crosslinked polymeric aminoethylstyrene, advantageously crosslinked with up to 8 weight percent of a crosslinking agent, in particulate form with glycolonitrile and hydrolyzing the resulting polymeric vinylbenzyl aminoacetonitrile to get crosslinked polymeric vinylbenzyl aminoacetic acid.

Polymeric vinylbenzyl aminoacetic acid chelating resins have previously been made by reacting polymeric aminomethylstyrene with chloroacetic acid. The chloroacetic acid method has the disadvantages that disubstitution occurs, and possibly quaternization. Also, chloroacetic acid is both corrosive and relatively expensive. In the reaction with chloroacetic acid, troublesome hydrogen chloride is given off.

It has now been discovered that polymeric vinylbenzyl aminoacetic acid chelating resins can be prepared by reacting polymeric vinylbenzylamine, crosslinked with about 1 to about 8 weight percent of a crosslinking agent, and preferably about 1 to 2 percent thereof, with glycolonitrile, per se or formed in situ from formaldehyde and hydrogen cyanide, and hydrolyzing the resulting nitrile. The process is carried out advantageously by swelling the particulate polymeric crosslinked vinylbenzylamine with a swelling agent conventional for swelling chloromethylated polystyrene, i.e., an aromatic hydrocarbon of the benzene series, a chlorinated aliphatic or aromatic hydrocarbon, a cycloalkane having 4 to 6 carbon atoms, alkyl ethers, chloroalkyl ethers, and lower alcohols, e.g., chloroform, tetrachloroethane, ethylene dichloride, o-dichlorobenzene, 1,1,2-trichloroethane, 1,2,3-trichloropropane, cis-dichloroethylene, trichloroethylene, tetralin, pentachloroethane, methylchloroform, dioxane, perchloroethylene, carbon tetrachloride, ethylidene dichloride, chlorobenzene, toluene, ethylbenzene, benzene, chloromethyl ether, xylene, acetone, diethyl ether, cyclohexane, methanol and ethanol, and reacting the swollen polymeric aminomethylstyrene at about 15° to about 60° C. (preferably at about 25° to 40° C.) with substantially an equimolar proportion (up to about 10 percent excess) of glycolonitrile, aminomethyl group basis. Excess glycolonitrile up to 4 moles per mole of polymeric vinylbenzylamine can be used to expedite the reaction.

The resulting polymeric crosslinked vinylbenzyl acetonitrile is then hydrolyzed, advantageously at about 80° to about 90° C., with a stoichiometric excess of a dilute mineral acid, preferably twice to four times that of theory, until the nitrile groups have been substantially completely hydrolyzed to carboxyl groups. This generally requires up to about 20 hours, and can be determined by following the copper chelation capacity to a maximum value. The resulting resin beads are then washed thoroughly with water, advantageously at room temperature and buffered to a pH of about 4.5 with one-molar sodium acetate and one-molar acetic acid. When then contacted with cupric ions, a blue copper chelate is formed.

The following examples are in illustration of the invention and not in limitation thereof.

*Example 1*

A quantity of 0.024 g. mole polymeric vinylbenzylamine beads, monomer basis, crosslinked with 2 weight percent of divinylbenzene, was swelled in methylene chloride for about one hour. Then 0.024 g. mole glycolonitrile as an aqueous 50 weight percent solution was added and the mixture was stirred 19 hours while kept at 25° C. The resulting beads were hydrolyzed with 50 grams of 15 weight percent sulfuric acid at 80°–90° C. for about 20 hours. The product beads were washed thoroughly with water and buffered to a pH of 4.5 with one-molar sodium acetate and one-molar acetic acid prior to forming the copper chelate. The beads when contacted with cupric ions gave a characteristic blue copper chelate having a capacity of about 1.5 millimoles of $Cu^{++}$ per g. of dry beads.

*Example 2*

The procedure of Example 1 was repeated, using proportions of 0.024 g. mole of the polymeric vinylbenzylamine beads, monomer basis, and 0.096 g. mole of glycolonitrile and a 15 hour reaction time. The chelating resin so obtained was not significantly different from the product of Example 1.

What is claimed is:
1. A method for making a chelating resin having combined vinylbenzyl aminoacetic acid units by reacting at temperatures between about 15° and about 60° C. polymeric crosslinked vinylbenzylamine in particulate form, copolymerized with about 1 to 8 weight percent of a crosslinking agent containing two vinylidene groups and swollen with a swelling agent conventional for swelling, and in amount sufficient to swell, chloromethylated polystyrene, with a substantially equivalent to form equivalent proportions of glycolonitrile, aminoethyl group basis, whereby polymeric vinylbenzyl aminoacetonitrile is formed and hydrolyzing the nitrile groups of the latter at temperatures between about 80° and about 90° C. with aqueous mineral acid.
2. The method of claim 1, wherein the vinylbenzylamine polymer is a polymer of vinylbenzylamine copolymerized with 2 weight percent of divinylbenzene and the reaction temperature is 25° C.

References Cited in the file of this patent
UNITED STATES PATENTS

| | | |
|---|---|---|
| 2,825,714 | Melamed | Mar. 4, 1958 |
| 2,840,603 | Mock et al. | June 24, 1958 |
| 2,875,162 | Morris | Feb. 24, 1959 |
| 2,910,445 | Mock et al. | Oct. 27, 1959 |

OTHER REFERENCES

Noller: Chemistry of Organic Compounds, 2nd edition, Saunders (1957), page 955 under "Methylstyrenes," and p. 575.
Eieser et al.: Organic Chemistry, 3rd edition, Reinhold (1956), p. 432.
Migrdichian: The Chemistry of Organic Cyanogen Compounds, Reinhold (1947), pages 198–200.

UNITED STATES PATENT OFFICE

CERTIFICATE OF CORRECTION

Patent No. 3,043,809                  July 10, 1962

Leonard A. Mattano

It is hereby certified that error appears in the above numbered patent requiring correction and that the said Letters Patent should read as corrected below.

Column 2, line 41, for "form" read -- four --.

Signed and sealed this 24th day of September 1963.

(SEAL)
Attest:

ERNEST W. SWIDER
Attesting Officer

DAVID L. LADD
Commissioner of Patents